United States Patent [19]
Abe

[11] Patent Number: 5,729,390
[45] Date of Patent: Mar. 17, 1998

[54] OBJECTIVE LENS SYSTEM

[75] Inventor: Tetsuya Abe, Hokkaido, Japan

[73] Assignee: Asahi Kogaku Kogyo Kabushiki Kaisha, Tokyo, Japan

[21] Appl. No.: 666,791

[22] Filed: Jun. 19, 1996

[30] Foreign Application Priority Data

Jun. 19, 1995 [JP] Japan .................................. 7-175520

[51] Int. Cl.$^6$ .............................. G02B 21/02; G02B 9/06
[52] U.S. Cl. ................................................ 359/661; 359/794
[58] Field of Search ............................ 359/646, 661, 359/794

[56] References Cited

U.S. PATENT DOCUMENTS

| | | | |
|---|---|---|---|
| 4,134,645 | 1/1979 | Sugiyama et al. | 359/748 |
| 4,753,524 | 6/1988 | Sugiyama | 359/794 |
| 5,162,945 | 11/1992 | Matsuo et la. | 359/646 |

FOREIGN PATENT DOCUMENTS

| | | | |
|---|---|---|---|
| 54-16854 | 6/1979 | Japan . | |
| 57-46221 | 3/1982 | Japan | 359/794 |
| 57-93309 | 6/1982 | Japan . | |
| 5-60969 | 3/1993 | Japan . | |

*Primary Examiner*—David C. Nelms
*Assistant Examiner*—Evelyn A. Lester
*Attorney, Agent, or Firm*—Greenblum & Bernstein, P.L.C.

[57] ABSTRACT

An objective lens system includes a positive first lens group having a positive lens element and a negative lens element, and a positive second lens group, in this order from the object side. The objective lens system satisfies the following relationships:

$$1.10 < f_1/f < 2.00,$$

$$|\theta p - \theta n| < 0.02, \text{ and}$$

$$0.3 < L/f < 0.6$$

wherein f represents the focal length of the whole lens system, $f_1$ represents the focal length of the first lens group, $\theta p$, $\theta n$ represent the mean values of partial dispersion ratios of the positive and negative lens elements, represented by $(n_g - n_F)/(n_F - n_C)$, respectively, and L represents the distance between the first and second lens groups.

6 Claims, 6 Drawing Sheets

Spherical Aberration
Chromatic Aberration

Fig. 2b

Astigmatism

Fig. 2c

Distortion

Spherical Aberration

Chromatic Aberration

Astigmatism

Distortion

Spherical Aberration

Chromatic Aberration

Astigmatism

Distortion

Fig. 7a

FNo. 1:6.4

—— d Line
------ h Line
——— C Line
—·—· F Line
—··— A' Line

-0.01    0.01
Spherical
Aberration

Chromatic
Aberration

-0.1    0.1
Astigmatism

-5.0    5.0 %
Distortion

FNo. 1:6.4

— d Line
--- h Line
—·— C Line
—··— F Line
—···— A' Line

−0.01  0.01
Spherical
Aberration

Chromatic
Aberration

−0.1  0.1
Astigmatism

−5.0  5.0 %
Distortion

OBJECTIVE LENS SYSTEM

BACKGROUND OF THE INVENTION

1. Field of the Invention

The present invention relates to an objective lens system having a long focal length, an aperture ratio of around 1:6 and a half angle of view of around 2° to 5°, for use in an astronomical telescope or the like.

2. Description of the Related Art

An objective lens system for an astronomical telescope is, in its simplest form, comprised of one positive lens and one negative lens in combination. However, with this arrangement it is difficult to prevent a secondary spectrum of chromatic aberration from occurring.

An objective lens system disclosed in, for example, Japanese Unexamined Patent Publication No. 57-93309 or No. 5-60969 consists of a first lens group positioned on the object side having a positive lens element and a negative lens element, and a second lens group positioned in the vicinity of an image surface of the first lens group to correct the curvature of field, in order to increase the aperture ratio and the angle of view. In the objective lens system disclosed in JUPP '309 or JUPP '969, since the lens elements thereof are made of a special glass material, the chromatic aberration including the secondary spectrum can be effectively eliminated in the visible region.

However, in those objective lens systems, a relatively large chromatic aberration occurs in the near-ultraviolet region or near-infrared region, outside of the visible region. Accordingly, if a picture is photographed using an image pickup device, such as a CCD, or a special film which is sensitive to light other than the visible region, a high quality image (good image formation) cannot be obtained.

Moreover, in the conventional objective lens system as mentioned above, the second lens group contributes chiefly to a correction of the curvature of field, and a substantial part of the chromatic aberration and the spherical aberration is compensated for by the opposed surfaces of the positive and negative lens elements of the first lens group. Consequently, differences in the spherical aberration due to wavelength (color) differences occur.

An objective lens system disclosed in Japanese Examined Patent Publication No. B4-16854 consists of a combination of two positive lens elements and one negative lens element, on the object side, wherein each lens surface contributes to the correction of the chromatic aberration and the spherical aberration, to thereby restrict the occurrence of differences in the spherical aberration due to wavelength differences. However, since the three lens elements are located on the object side, the diameter, weight and manufacturing cost of each of the three lens elements is remarkably increased, in comparison with an arrangement in which only two lens elements are located on the side closest to the object.

SUMMARY OF THE INVENTION

It is an object of the present invention to provide an objective lens system having a long focal length, a large aperture ratio and a large angle of view, in which there is little or no difference in the spherical aberration due to wavelength and in which little or no chromatic aberration occurs in a wide wavelength band from the near-ultraviolet region to the near-infrared region, without increasing the number of lens elements of the lens group located closest to the object, To achieve the object mentioned above, according to the present invention, there is provided an objective lens system having a positive first lens group including positive lens element and a negative lens element, and a positive second lens group, in this order from the object side. The objective lens system satisfies the following relationships defined by formulae (1), (2) and (3) below:

$$1.10 < f_1/f < 2.00 \tag{1}$$

$$|\theta p - \theta n| < 0.02 \tag{2}$$

$$0.3 < L/f < 0.6 \tag{3}$$

Here f represents the focal length of the whole lens system, $f_1$ represents the focal length of the first lens group, and $\theta p$, $\theta n$ respectively represent the mean value of the partial dispersion ratio of the positive and negative lens elements (i.e., if there is only one positive lens element, or only one negative lens element, in the lens system, then the partial dispersion ratio for that lens element is used, while if there is more than one positive lens element, or more than one negative lens element, then the mean partial dispersion ratio value of those positive, or negative, lens elements is used) represented by $(n_g - n_F)/(n_F - n_C)$ ($n_g$, $n_F$ and $n_C$ represent the refractive index at the g-line, F-line and C-line, respectively), and L represents the distance between the first and second lens groups.

Formula (1) specifies the ratio of the power of the first lens group to the power of the whole objective lens system. If the objective lens system satisfies formula (1), the differences in the spherical aberration due to wavelength can be minimized while balancing the powers of the first and second lens groups.

If the ratio defined in formula (1) is above the upper limit, the power of the first lens group is too small to converge the light onto the second lens group, thus making it necessary to increase the diameter of the second lens group, thus leading to an increased weight and an increased cost of the objective lens. If the ratio defined in formula (1) is below the lower limit, the power of the first lens group is so large that the correction of the spherical aberration and the chromatic aberration relies mainly upon the first lens group, thus resulting in a difference in the magnitude of the spherical aberration due to the wavelength.

Formula (2) specifies the difference in the partial dispersion ratio between the positive and negative lens elements of the whole lens system. If the difference is smaller than the upper limit, the secondary spectrum which remains after the chromatic aberration is corrected can be effectively restricted in a wide wavelength region. If the difference exceeds the upper limit in formula (2), the secondary spectrum of the chromatic aberration occurs, so that a high quality image (good image formation) cannot be obtained depending on the wavelength.

Formula (3) specifies the distance between the first and second lens groups. If the distance satisfies formula (3), the aberration can be corrected by the first and second lens groups in a well balanced state without increasing the diameter of the second lens group.

If the distance is above the upper limit in formula (3), since the second lens group is spaced from the first lens group by a large distance, the power of the second lens group must be increased relative to the power of the first lens group determined to satisfy the requirement specified in formula (1). This upsets the balance of the aberration correction between the first and second lens group and produces a large difference in the magnitude of the spherical aberration due to the wavelength. If the distance is smaller than the lower limit in formula (3), the distance between the first and second lens groups is so small that the second lens group is located in a position in which no light can be effectively converged. To avoid this, it is necessary to increase the diameter of the second lens group, thus resulting in an increase in the weight and manufacturing cost of the objective lens system.

In a preferred embodiment of the present invention, the second lens group consists of a positive lens element and a negative lens element. In this embodiment, the second lens group preferably satisfies the following formulae (4), (5), (6) and (7):

$$0.1 < f_{2p}/f < 0.7 \quad (4)$$

$$-0.7 < f_{2n}/f < -0.1 \quad (5)$$

$$v_{2p} > 60 \quad (6)$$

$$n_{2n} < 1.6 \quad (7)$$

Here $f_{2p}$ represents the focal length of the positive lens element of the second lens group, $f_{2n}$ represents the focal length of the negative lens element of the second lens group, $v_{2p}$ represents the Abbe number of the positive lens element of the second lens group, and $n_{2n}$ represents the refractive index at the d-line of the negative lens element of the second lens group.

Formulae (4) and (5) respectively specify the powers of the positive and negative lens elements belonging to the second lens group. If the powers satisfy the requirements specified in formulae (4) and (5), little or no difference in the magnitude of the spherical aberration due to the wavelength occurs, and the second lens group holds an adequate spherical aberration correction function.

If the power is larger than the upper limit in formula (4) or smaller than the lower limit in formula (5), the aberration correction effect of the second lens group is insufficient. Conversely, if the power is smaller than the lower limit in formula (4) or larger than the upper limit in formula (5), the aberration correction effect of the second lens group is excessive. In either case, a difference in the magnitude of the spherical aberration due to the wavelength is caused due to an imbalance in the spherical aberration correction effect between the first and second lens groups.

Formula (6) specifies the dispersive power of the positive lens element of the second lens group. If the Abbe number of the positive lens element satisfies the requirement specified in formula (6), there is little or no chromatic aberration caused in the positive lens element of the second lens group which is set to satisfy the requirement specified by formula (4). The chromatic aberration, if any, can be easily corrected by the negative lens element of the second lens group.

If the Abbe number is smaller than the lower limit in formula (6), the chromatic aberration caused by the positive lens element of the second lens group is too large to correct the chromatic aberration of the second lens group as a whole.

Formula (7) specifies the refractive index of the negative lens element of the second lens group. It is preferable that the positive lens element is made of a glass material having a low dispersive power, in view of the correction of the chromatic aberration. However, in general, a glass material having a low dispersive power has a low refractive index. Accordingly, if a positive lens element made of a glass material having a low dispersive power is used, the Petzval sum becomes large. To prevent this, in the present invention, the negative lens element is preferably made of a glass material having a refractive index smaller than the upper limit defined in formula (7), so that the Petzval sum approximates zero to thereby prevent the occurrence of the curvature of field. If the refractive index defined in formula (7) is larger than the upper limit, the Petzval sum is so large that the curvature of field is large, and hence it is difficult to obtain a high quality image in a wide angle of view range.

To eliminate or restrict the chromatic aberration, the objective lens system according to the present invention preferably satisfies the following formulae (8) and (9):

$$v_{1p} > 70 \quad (8)$$

$$v_{1n} > 45 \quad (9)$$

Here $v_{1p}$ represents the Abbe number of the positive lens element of the first lens group, and $v_{1n}$ represents the Abbe number of the negative lens element of the first lens group.

Formula (8) relates to the dispersion of the positive lens element of the first lens group in which the largest amount of the chromatic aberration is produced. If the first lens group satisfies the requirement specified in formula (8), the occurrence of the chromatic aberration can be effectively restricted. If the Abbe number of the positive lens element of the first lens group is smaller than the lower limit, it is difficult to correct for chromatic aberration caused by the positive lens element by the other lens elements. Namely, a high quality image cannot be obtained.

Formula (9) relates to the dispersion of the negative lens element of the first lens group. If the negative lens element satisfies the requirement specified in formula (9), the chromatic aberration can be adequately corrected by the first lens group combined with the correction of the chromatic aberration by the second lens group. If the Abbe number of the negative lens element of the first lens group is smaller than the lower limit, the correction of the chromatic aberration by the first lens group is excessive, thus leading to a large difference in the magnitude of the spherical aberration due to the wavelength.

Preferably, the first lens group consists of a positive biconvex lens element and a negative lens element having a concave surface facing the object, in this order from the object side; or a negative meniscus lens element having a convex surface facing the object side and a positive lens element having a convex surface facing the object side, in this order from the object side. In the former arrangement, the first lens group preferably satisfies the following formula (10) and in the latter arrangement, the first lens group preferably satisfies the following formula (11):

$$-1.6 < r_1/r_2 < -0.4 \quad (10)$$

$$d_2/f < 0.02 \quad (11)$$

Here $r_1$, $r_2$ represent the radius of curvature of the surfaces of the positive lens element of the first lens group, that are located on the object side and image side, respectively, and $d_2$ represents the distance between the positive lens element and the negative lens element of the first lens group.

Formula (10) specifies the shape of the positive lens element of the first lens group provided on the object side. If the positive lens element satisfies formula (10), the spherical aberration can be appropriately corrected by the first lens group, while keeping a balance with the correction of the spherical aberration by the second lens group.

If the value of the ratio defined in formula (10) is above the upper limit, the correction of the spherical aberration by the first lens group is insufficient. Conversely, if the value of the ratio is below the lower limit, the correction of the spherical aberration by the first lens group is excessive. In either case, the correction of the spherical aberration by the first and second lens groups is unbalanced, thus resulting in an increased difference in the magnitude of the spherical aberration due to the wavelength.

Formula (11) specifies the distance between the positive and negative lens elements of the first lens group. In the present invention, the positive lens element is preferably made of a glass material having a low dispersive power to restrict the occurrence of the chromatic aberration, as mentioned above. In general, a glass material having a low dispersive power is not very hard, and hence, if it is located closest to the object, the glass tends to be scratched. If the positive lens is located closer to an image to be formed than the negative lens element, the negative lens element serves as a cover glass to protect the positive lens element from being scratched.

In the case that the negative lens element is located closest to the object, if the distance between the negative and positive lens elements is large, it is necessary to increase the diameter of the positive lens element to receive the light diverged by the negative lens element. To prevent this, the distance preferably meets the requirement defined in formula (11), so that the diameter of the positive lens element can be appropriately set.

If the ratio is larger than the upper limit defined in formula (11), the diameter of the positive lens element is so large that the weight and manufacturing cost of the objective lens system unacceptably increase.

To prevent the occurrence of the curvature of field, the objective lens system satisfies the following formula (12):

$$n_{2p}/n_{2n} > 1.0 \quad (12)$$

Here $n_{2p}$, $n_{2n}$ represent the refractive index at the d-line of the positive and negative lens elements of the second lens group, respectively.

Formula (12) specifies that the refractive index of the positive lens element of the second lens group is larger than the refractive index of the negative lens element thereof. If the objective lens satisfies formula (12), the Petzval sum approximates to zero, so that the field of curvature can be minimized. If the ratio defined in formula (12) is below the lower limit, the Petzval sum is too large to eliminate the curvature of field.

The present disclosure relates to subject matter contained in Japanese Patent Application No. 7-175520 (filed on Jun. 19, 1995) which is expressly incorporated herein by reference in its entirety.

BRIEF DESCRIPTION OF THE DRAWINGS

The present invention will be described below with reference to the accompanying drawings, in which similar parts are indicated by like reference numbers, and wherein.

DESCRIPTION OF THE PREFERRED EMBODIMENTS

Eight embodiments of an objective lens system according to the present invention will be discussed below, with reference to the attached drawings.

Figure 1:
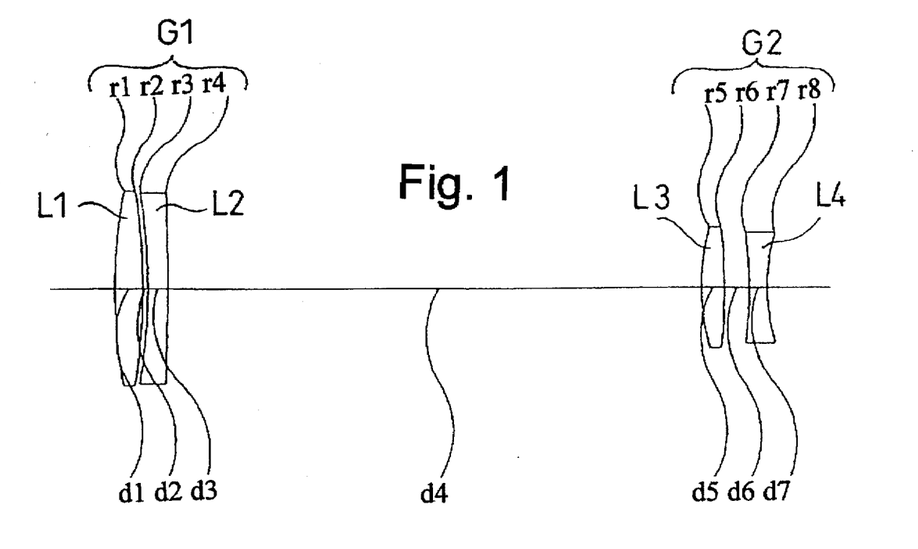
FIG. 1 is a schematic view of an optical system of an objective lens system according to a first embodiment of the present invention.
Figure 8:
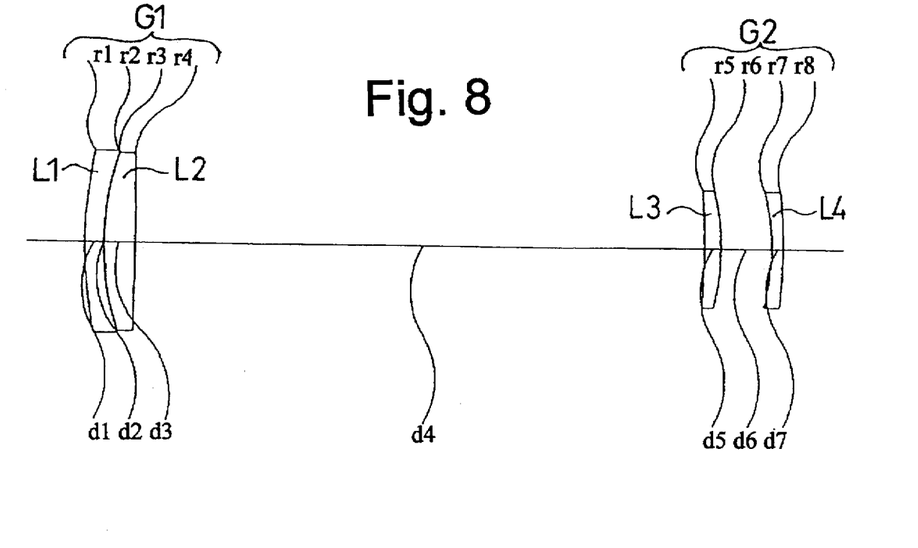
FIG. 8 is a schematic view of an optical system of an objective lens system according to a seventh embodiment of the present invention.

In the illustrated embodiments, the objective lens system consists of a positive first lens group G1 and a positive second lens group G2 which is spaced from the first lens group G1, in the optical axis direction. In the first to sixth embodiments, the positive first lens group G1 consists of a biconvex first lens element L1 and a negative second lens element L2 having a concave surface located on the object side, in this order from the object side (i.e., from the left in the drawings). The positive second lens group G2 consists of a biconvex third lens element L3 and a biconcave fourth lens element L4.

In the following tables and the aberration diagrams, "FNo." represents the F-number of the lens, "f" represents the focal length, "ω" represents the half angle of view, "r" represents the radius of curvature, "d" represents the distance between the lens surfaces, "n" represents the refractive index at the d-line (588 nm), and "ν" represent the Abbe number at the d-line. Also, the "d-line", "h-line (405 nm)", "C-line (656 nm)", "F-line (486 nm)", and "A'-line (768 nm)" represent the chromatic aberration occurring from the spherical aberration at the respective wavelengths. The aberration diagrams include an astigmatism diagram (S represents sagittal rays, M represents meridional rays) and a distortion diagram.

FIG. 1 shows a first embodiment of an objective lens system according to the present invention.

Figure 2A:
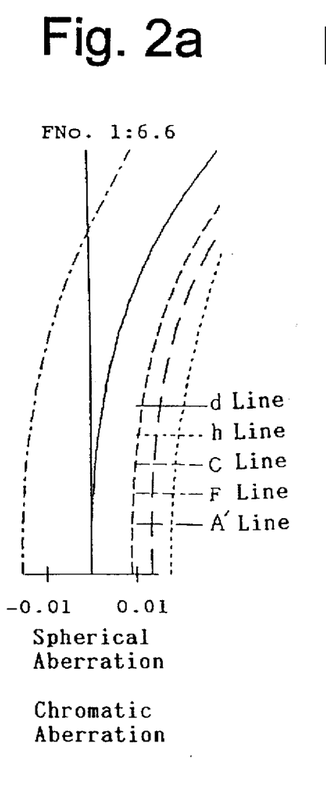
FIGS. 2a, 2b, and 2c are diagrams of aberrations of the objective lens system according to the first embodiment of the present invention.
Figure 2B:
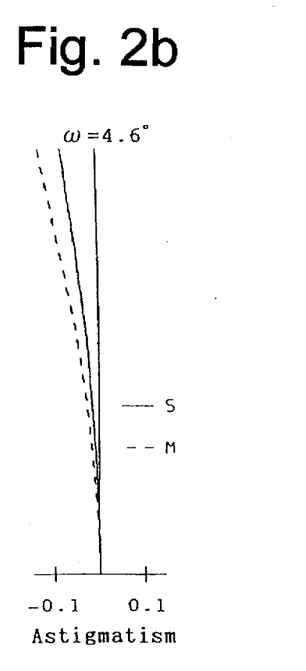
Figure 2C:
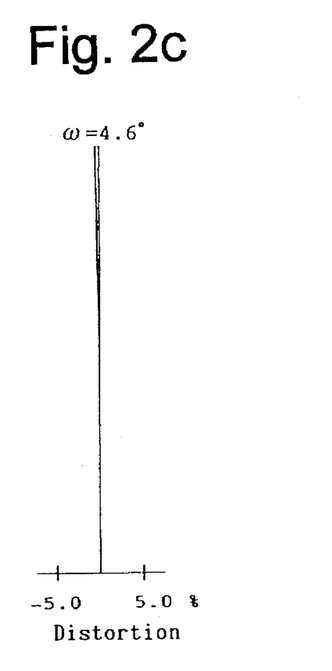
Figures 3A, 3B:
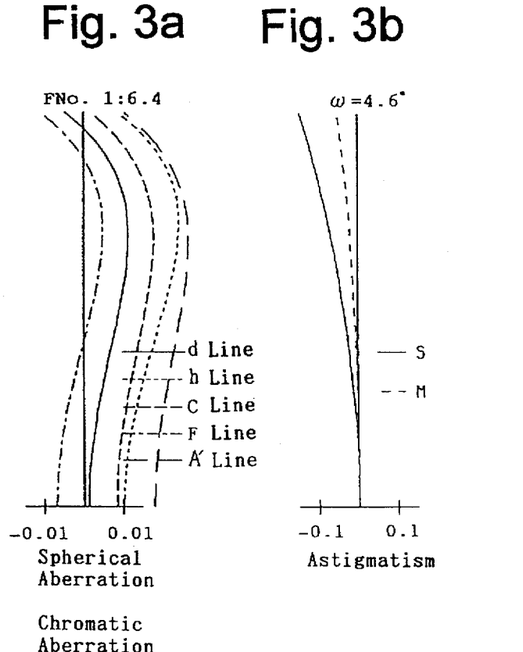
FIGS. 3a, 3b, and 3c are diagrams of aberrations of an objective lens system according to a second embodiment of the present invention.
Figure 3C:
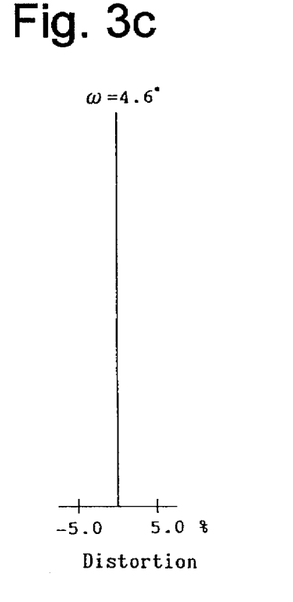
Figures 4A, 4B:
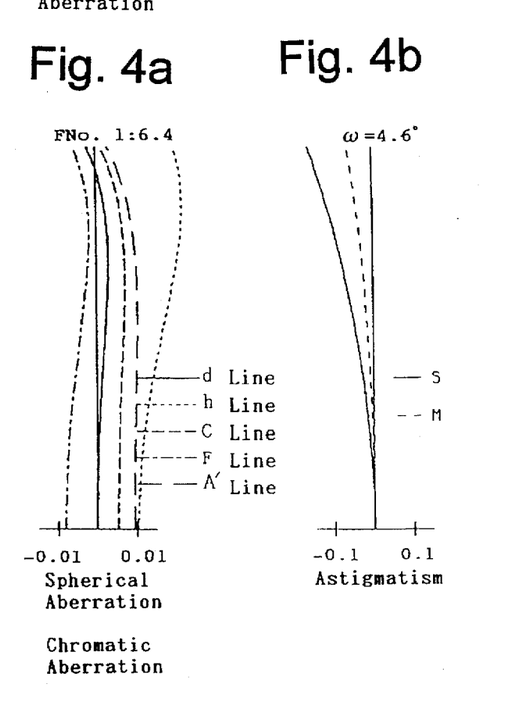
FIGS. 4a, 4b, and 4c are diagrams of aberrations of an objective lens system according to a third embodiment of the present invention.
Figure 4C:
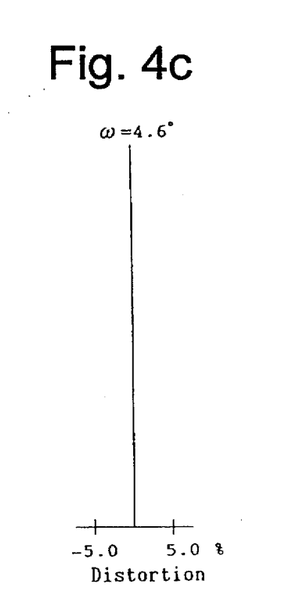
Figure 5A:
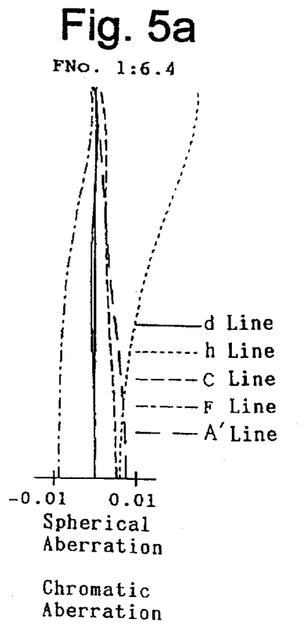
FIGS. 5a, 5b, and 5c are diagrams of aberrations of an objective lens system according to a fourth embodiment of the present invention.
Figure 5B:
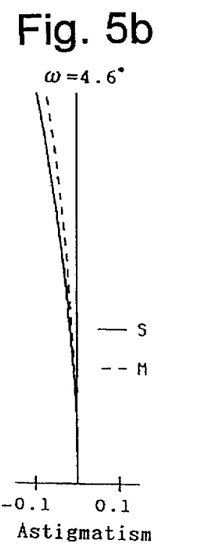
Figure 5C:
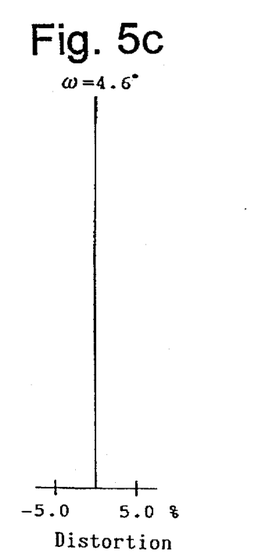
Figure 6A:
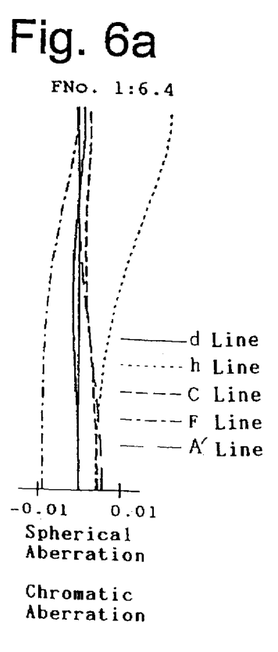
FIGS. 6a, 6b, and 6c are diagrams of aberrations of an objective lens system according to a fifth embodiment of the present invention.
Figure 6B:
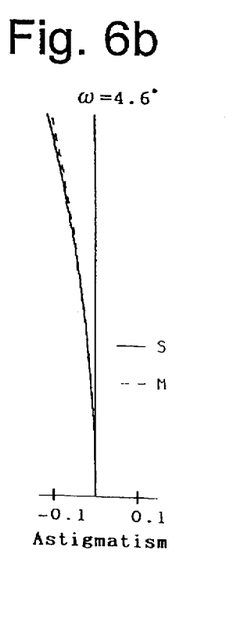
Figure 6C:
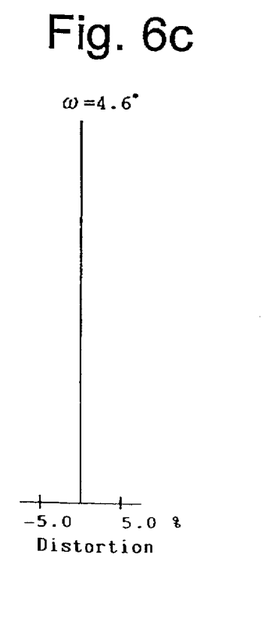
Figure 7A:
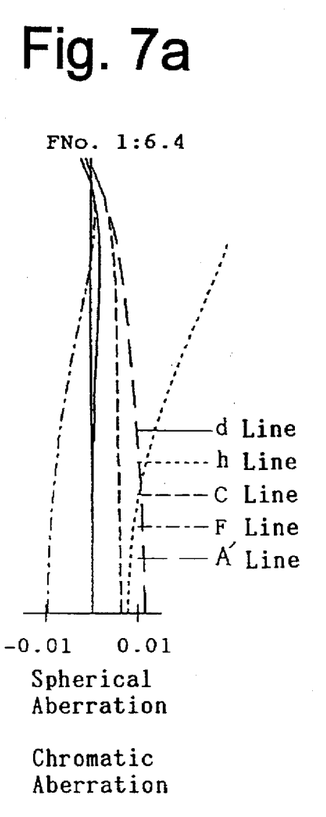
FIGS. 7a, 7b, and 7c are diagrams of aberrations of an objective lens system according to a sixth embodiment of the present invention.
Figure 7B:
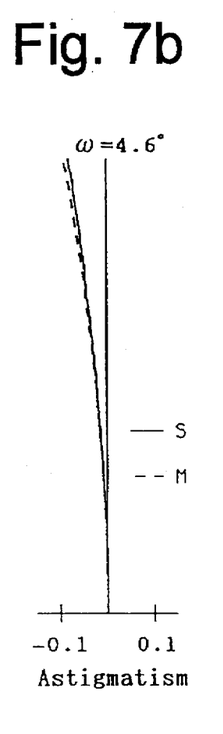
Figure 7C:
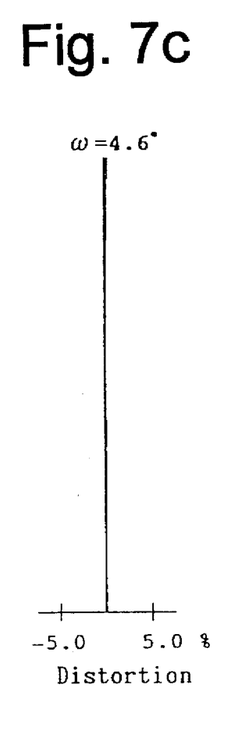

Numerical data regarding the first embodiment is shown in Table 1 below, and FIG. 2 is a diagram showing aberrations of the first embodiment.

TABLE 1

| | FNo. = 1:6.6 f = 99.988 ω = 4.5° | | | |
| --- | --- | --- | --- | --- |
| Surface No. | r | d | n | ν |
| 1 | 44.096 | 2.245 | 1.43875 | 94.97 |
| 2 | −44.096 | 0.379 | — | — |
| 3 | −46.763 | 1.559 | 1.73400 | 51.50 |
| 4 | −213.237 | 45.239 | — | — |
| 5 | 18.497 | 1.871 | 1.59240 | 68.30 |
| 6 | −42.398 | 2.024 | — | — |

TABLE 1-continued

FNo. = 1:6.6
f = 99.988
ω = 4.5°

| Surface No. | r | d | n | ν |
|---|---|---|---|---|
| 7 | −27.933 | 1.372 | 1.51823 | 59.00 |
| 8 | 15.647 | — | — | — |

Tables 2 through 6 respectively show numerical data regarding the second through sixth embodiments of an objective lens system according to the present invention, FIGS. 3 through 7 show aberration diagrams in the second through sixth embodiments, respectively. The lens arrangement in the second through sixth embodiments is the same as that of the first embodiment, shown in FIG. 1.

TABLE 2

FNo. = 1:6.4
f = 100.000
ω = 4.6°

| Surface No. | r | d | n | ν |
|---|---|---|---|---|
| 1 | 52.820 | 2.254 | 1.43875 | 94.97 |
| 2 | −36.830 | 1.252 | — | — |
| 3 | −36.774 | 1.565 | 1.69680 | 55.50 |
| 4 | −136.144 | 44.744 | — | — |
| 5 | 134.624 | 1.377 | 1.60300 | 65.50 |
| 6 | −32.761 | 4.382 | — | — |
| 7 | −25.530 | 0.939 | 1.52130 | 52.60 |
| 8 | 864.243 | — | — | — |

TABLE 3

FNo. = 1:6.4
f = 100.000
ω = 4.6°

| Surface No. | r | d | n | ν |
|---|---|---|---|---|
| 1 | 44.056 | 2.253 | 1.49700 | 81.60 |
| 2 | −48.272 | 1.252 | — | — |
| 3 | −48.662 | 1.564 | 1.72916 | 54.70 |
| 4 | 457.557 | 45.664 | — | — |
| 5 | 55.159 | 1.502 | 1.59240 | 68.30 |
| 6 | −32.117 | 2.006 | — | — |
| 7 | −26.295 | 0.939 | 1.51454 | 54.70 |
| 8 | 98.074 | — | — | — |

TABLE 4

FNo. = 1:6.4
f = 99.995
ω = 4.6°

| Surface No. | r | d | n | ν |
|---|---|---|---|---|
| 1 | 34.020 | 2.237 | 1.43875 | 94.97 |
| 2 | −48.758 | 0.929 | — | — |
| 3 | −49.700 | 1.553 | 1.71300 | 53.90 |
| 4 | ∞ | 43.015 | — | — |
| 5 | 20.501 | 1.367 | 1.49700 | 81.60 |
| 6 | −35.411 | 3.063 | — | — |
| 7 | −22.647 | 0.932 | 1.48749 | 70.20 |
| 8 | 22.647 | — | — | — |

TABLE 5

FNo. = 1:6.4
f = 100.007
ω = 4.6°

| Surface No. | r | d | n | ν |
|---|---|---|---|---|
| 1 | 34.653 | 2.195 | 1.43875 | 94.97 |
| 2 | −49.899 | 0.458 | — | — |
| 3 | −51.985 | 1.537 | 1.71300 | 53.90 |
| 4 | ∞ | 42.020 | — | — |
| 5 | 20.856 | 1.464 | 1.49700 | 81.60 |
| 6 | −34.801 | 2.927 | — | — |
| 7 | −22.905 | 0.878 | 1.48749 | 70.20 |
| 8 | 22.905 | — | — | — |

TABLE 6

FNo. = 1:6.4
f = 100.000
ω = 4.6°

| Surface No. | r | d | n | ν |
|---|---|---|---|---|
| 1 | 33.263 | 2.388 | 1.43875 | 94.97 |
| 2 | −45.369 | 0.597 | — | — |
| 3 | −47.113 | 1.552 | 1.71300 | 53.90 |
| 4 | ∞ | 40.513 | — | — |
| 5 | 21.421 | 1.592 | 1.49700 | 81.60 |
| 6 | −41.439 | 4.101 | — | — |
| 7 | −23.336 | 0.895 | 1.48749 | 70.20 |
| 8 | 23.336 | — | — | — |

Figure 9A:
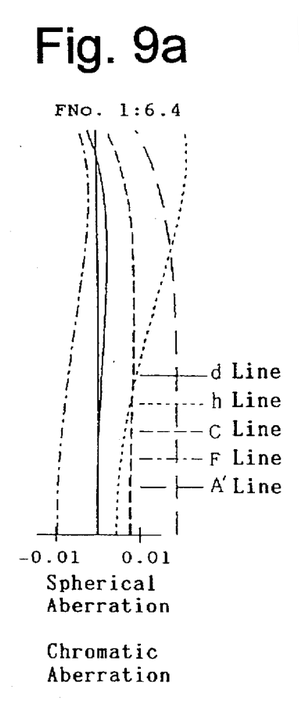
FIGS. 9a, 9b, and 9c are diagrams of aberrations of the objective lens system according to the seventh embodiment of the present invention; and, FIGS. 10a, 10b, and 10c are diagrams of aberrations of an objective lens system according to an eighth embodiment of the present invention.
Figure 9B:
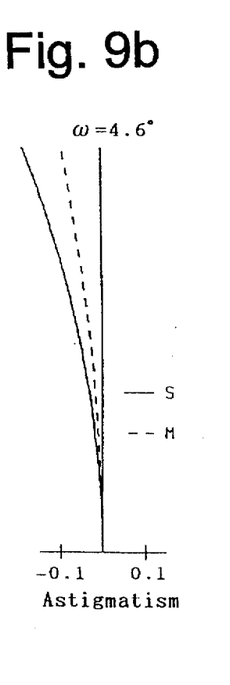
Figure 9C:
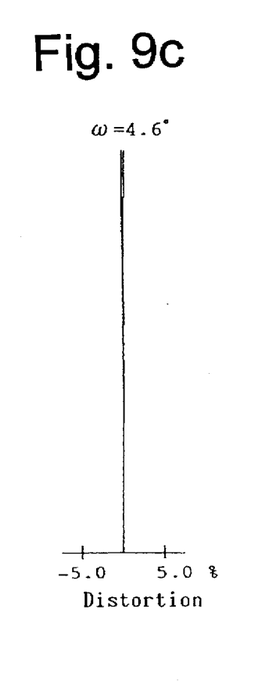

FIG. 8 shows a seventh embodiment of an objective lens system according to the present invention. In the seventh and eighth embodiments, the first lens element L1 of the first lens group G1 is a negative meniscus lens having a convex surface located on the object side, and the second lens element L2 is a positive lens having a convex surface located on the object side. In the seventh embodiment, the third lens element L3 of the second lens group G2 is a positive meniscus lens having a concave surface located on the object side, and the fourth lens element L4 is a negative meniscus lens having a concave surface located on the object side. Numerical data regarding the seventh embodiment is shown in Table 7 below. The aberration diagrams of the seventh embodiment are shown in FIG. 9.

TABLE 7

FNo. = 1:6.4
f = 100.000
ω = 4.6°

| Surface No. | r | d | n | ν |
|---|---|---|---|---|
| 1 | 40.571 | 1.564 | 1.71300 | 53.90 |
| 2 | 24.388 | 0.063 | — | — |
| 3 | 24.805 | 2.503 | 1.43875 | 94.97 |
| 4 | −414.601 | 47.663 | — | — |
| 5 | −80.117 | 1.376 | 1.59240 | 68.30 |
| 6 | −22.980 | 4.380 | — | — |
| 7 | −19.566 | 0.938 | 1.51742 | 52.40 |
| 8 | −49.675 | — | — | — |

Figures 10A, 10B:
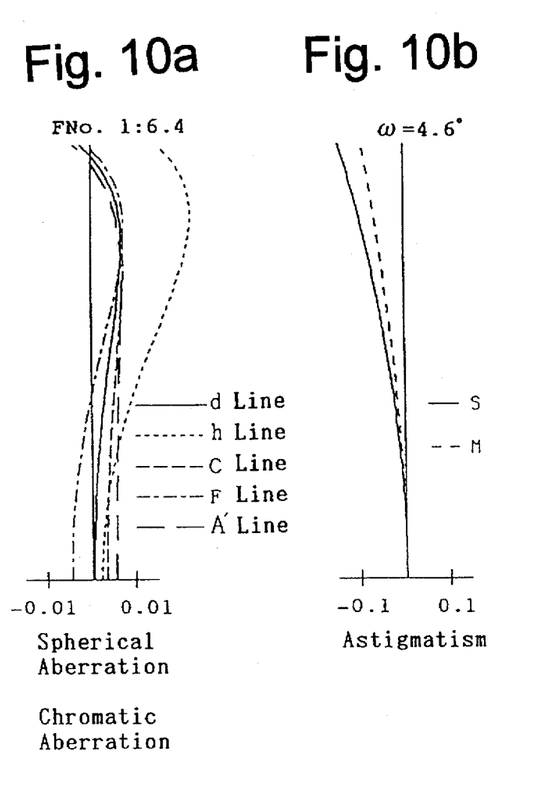
Figure 10C:
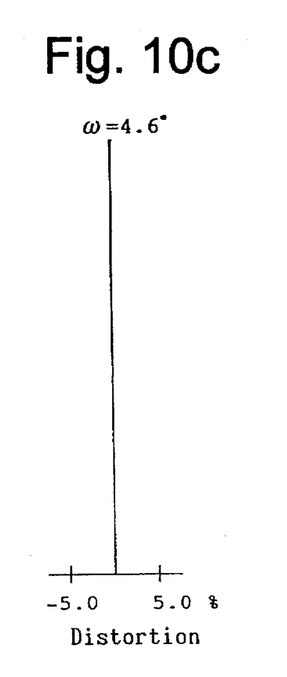

Table 8 shows numerical data regarding the eighth embodiment according to the present invention. The lens arrangement of the eighth embodiment the substantially identical to that of the seventh embodiment. The eighth embodiment differs from the seventh embodiment only in that the third lens element L3 of the second lens group G2 is a biconvex lens, and the fourth lens element L4 is a biconcave lens. FIG. 10 shows aberration diagrams of the eighth embodiment.

TABLE 8

FNo. = 1:6.4
f = 100.000
ω = 4.6°

| Surface No. | r | d | n | ν |
|---|---|---|---|---|
| 1 | 27.254 | 1.561 | 1.71300 | 53.90 |
| 2 | 17.425 | 0.025 | — | — |
| 3 | 17.417 | 2.498 | 1.43875 | 94.97 |
| 4 | 111.670 | 37.464 | — | — |
| 5 | 52.638 | 1.499 | 1.49700 | 81.60 |
| 6 | −25.374 | 4.371 | — | — |
| 7 | −20.029 | 0.937 | 1.48749 | 70.20 |
| 8 | 83.452 | — | — | — |

Table 9 below shows numerical examples of the eight embodiments as regards the formulae (1) through (12). With respect to formula (2), values of partial dispersion ratios $\theta 1$ to $\theta 4$, on which the calculation is based, are also shown. It should be noted that $\theta 1$ to $\theta 4$ respectively represent the partial dispersion ratio for each of the lenses. As can be seen from Table 9, the eight embodiments satisfy all the requirements defined by the formulae (1) through (12).

TABLE 9

| | | | | Embodiment | | | | |
|---|---|---|---|---|---|---|---|---|
| Formula | 1 | 2 | 3 | 4 | 5 | 6 | 7 | 8 |
| 1 $f_1/f$ | 1.289 | 1.481 | 1.799 | 1.259 | 1.255 | 1.242 | 1.378 | 1.418 |
| 2 $|\theta p-\theta n|$ | 0.0060 | 0.0080 | 0.0060 | 0.0010 | 0.0010 | 0.0010 | 0.0005 | 0.0090 |
| 3 L/f | 0.452 | 0.447 | 0.457 | 0.430 | 0.420 | 0.405 | 0.477 | 0.375 |
| 4 $f_{2p}/f$ | 0.220 | 0.438 | 0.345 | 0.263 | 0.265 | 0.287 | 0.539 | 0.347 |
| 5 $f_{3n}/f$ | −0.192 | −0.476 | −0.402 | −0.231 | 0.234 | −0.238 | −0.631 | −0.330 |
| 6 $\nu_{1p}$ | 68.3 | 65.5 | 68.3 | 81.6 | 1.6 | 81.6 | 68.3 | 81.6 |
| 7 $n_{2n}$ | 1.518 | 1.521 | 1.515 | 1.487 | 1.487 | 1.487 | 1.517 | 1.487 |
| 8 $\nu_{1p}$ | 95.0 | 95.0 | 81.6 | 95.0 | 5.0 | 95.0 | 95.0 | 95.0 |
| 9 $\nu_{1n}$ | 51.5 | 55.5 | 54.7 | 93.09 | 3.9 | 53.9 | 53.9 | 53.9 |
| 10 $r_1/r_2$ | −1.000 | −1.434 | −0.913 | −0.698 | 0.694 | −0.733 | — | — |
| 11 $d_2/f$ | — | — | — | — | — | — | 0.0006 | 0.0003 |
| 12 $n_{2p}/n_{3a}$ | 1.049 | 1.054 | 1.051 | 1.006 | 1.006 | 1.006 | 1.049 | 1.006 |
| θ 1 | 0.536 | 0.536 | 0.538 | 0.536 | 0.536 | 0.536 | 0.546 | 0.546 |
| θ 2 | 0.548 | 0.543 | 0.545 | 0.546 | 0.546 | 0.546 | 0.536 | 0.536 |
| θ 3 | 0.546 | 0.540 | 0.546 | 0.538 | 0.538 | 0.538 | 0.545 | 0.538 |
| θ 4 | 0.546 | 0.549 | 0.551 | 0.530 | 0.530 | 0.530 | 0.555 | 0.530 |

As may be understood from the above discussion, according to the present invention, since the first lens group and the second lens group both contribute to the correction of the chromatic aberration and the spherical aberration, not only can the difference in the magnitude of the spherical aberration due to the wavelength be minimized, but also the occurrence of the secondary spectrum of the chromatic aberration can be restricted in a wide wavelength region. Thus, a good image formation capability can be ensured to obtain a high contrast image if an image pickup device or a film which is sensitive not only to a visible region but also to a near-infrared region or near-ultraviolet region is used.

What is claimed is:

1. An objective lens system, comprising:
a positive first lens group; and
a positive second lens group, in this order from an object side, said positive first lens group having a positive lens element and a negative lens element
wherein said objective lens system satisfies the following relationships:

$1.10 < f_1/f < 2.00$ $|\theta p - \theta n| < 0.02$ $0.3 < L/f < 0.6$ wherein f represents a focal length of the objective lens system, $f_1$, represents a focal length of said first lens group, $\theta p$, $\theta n$ respectively represent a mean value of partial dispersion ratio of said positive and negative lens elements, represented by $(nF-nF)/(nF-nc)$, wherein ng, nF, and nc respectively represent a refractive index at a g-line, an F-line and a C-line, and L represents a distance between said first and second lens groups.

2. The objective lens system according to claim 1, wherein said second lens group comprises a positive lens element and a negative lens element, and wherein said second lens group satisfies the following relationships:

$0.1 < f_{2p}/f < 0.7$ $-0.7 < f_{2n}/f < -0.1$ $\nu_{2p} > 60$ $n_{2n} < 1.6$ wherein $f_{2p}$ represents a focal length of said positive lens element of said second lens group, $f_{2n}$ represents a focal length of said negative lens element of said second lens group, $\nu_{2p}$ represents an Abbe number of said positive lens element of said second lens group, and $n_{2n}$ represents a refractive index at a d-line of said negative lens element of said second lens group.

3. The objective lens system according to claim 1, wherein said lens system satisfies the following relationships:

$\nu_{1p} > 70$ $\nu_{1n} > 45$ wherein $\nu_{1p}$ represents an Abbe number of said positive lens element of said first lens group, and $\nu_{1n}$ represents an Abbe number of said negative lens element of said first lens group.

4. The objective lens system according to claim 1, wherein said positive lens element of said first lens group comprises a positive biconvex lens element and said negative lens element of said first lens group comprises a negative lens element having a concave surface facing said object side, in this order from said object side, and wherein said first lens group satisfies the following relationship:

$$-1.6 < r_1/r_2 < -0.4$$

wherein $r_1$, $r_2$ represent a radius of curvature of surfaces of said positive lens element of said first lens group, located on said object side and image side, respectively.

5. The objective lens system according to claim 1, wherein said negative lens element of said first lens group comprises a negative meniscus lens element having a convex surface facing said object side and each positive lens element of said first lens group comprises a positive lens element having a convex surface facing said object side in this order from said object side, said first lens group satisfying the following relationship:

$$d_2/f < 0.02$$

wherein $d_2$ represents a distance between said positive lens element and said negative lens element of said first lens group.

6. The objective lens system according to claim 2, wherein said lens system satisfies the following relationship:

$$n_{2p}/n_{2n} > 1.0$$

wherein $n_{2p}$, $n_{2n}$ represent a refractive index at a d-line of said positive and negative lens elements of said second lens group, respectively.

* * * * *